(12) United States Patent
Richin et al.

(10) Patent No.: US 7,758,914 B2
(45) Date of Patent: Jul. 20, 2010

(54) METHOD OF MANUFACTURING OR REPAIRING A COATING ON A METALLIC SUBSTRATE

(75) Inventors: Catherine Richin, Roinville sous Dourdan (FR); Alain Siccat, Bondoufle (FR)

(73) Assignee: SNECMA, Paris (FR)

( * ) Notice: Subject to any disclaimer, the term of this patent is extended or adjusted under 35 U.S.C. 154(b) by 845 days.

(21) Appl. No.: 11/138,300

(22) Filed: May 27, 2005

(65) Prior Publication Data
US 2005/0266157 A1 Dec. 1, 2005

(30) Foreign Application Priority Data
May 28, 2004 (FR) .................................. 04 05778

(51) Int. Cl.
  *B05D 3/10* (2006.01)
  *B05D 3/12* (2006.01)
  *B23B 43/00* (2006.01)
  *C23C 16/06* (2006.01)
  *C23C 16/02* (2006.01)
  *B32B 15/01* (2006.01)

(52) U.S. Cl. .................. 427/140; 427/142; 427/402; 427/250; 428/650; 428/670; 428/666

(58) Field of Classification Search ................ 427/142, 427/140, 250, 402; 428/650, 666, 670
See application file for complete search history.

(56) References Cited

U.S. PATENT DOCUMENTS

| | | | |
|---|---|---|---|
| 3,458,353 A * | 7/1969 | Baldi | 134/3 |
| 3,649,225 A * | 3/1972 | Simmons, Jr. | 428/651 |
| 4,537,927 A | 8/1985 | Baldi | |
| 5,043,378 A | 8/1991 | Packer et al. | |
| 6,221,512 B1 * | 4/2001 | Rickerby | 428/623 |
| 6,482,469 B1 | 11/2002 | Spitsberg et al. | |
| 6,485,780 B1 * | 11/2002 | Sangeeta et al. | 427/180 |
| 6,637,643 B2 * | 10/2003 | Hasz et al. | 228/119 |
| 6,676,992 B2 * | 1/2004 | Pfaendtner et al. | 427/142 |
| 7,008,522 B2 * | 3/2006 | Boucard et al. | 205/115 |
| 2005/0035086 A1 * | 2/2005 | Chen et al. | 216/83 |
| 2006/0029723 A1 * | 2/2006 | Rigney et al. | 427/8 |

FOREIGN PATENT DOCUMENTS

| | | | |
|---|---|---|---|
| EP | 718419 A2 * | 6/1996 | |
| EP | 0 839 553 A2 | 5/1998 | |
| EP | 1079002 A1 * | 2/2001 | |

OTHER PUBLICATIONS

Derwent Publications, AN 1993-375877, XP-002315971, SU 1773946, Nov. 7, 1992.
Derwent Publications, AN 2003-187704, XP-002315972, JP 2002-212494, Jul. 31, 2002.
Derwent Publications, AN 2003-894045, XP-002315973, KR 2003064121, Jul. 31, 2003.
Derwent Publications, AN 1982-30391E, XP-002315974, SU-834236, May 30, 1981.
Derwent Publications, AN 1993-074230, XP-002315975, SU 1721121, Mar. 23, 1992.

* cited by examiner

*Primary Examiner*—Timothy H Meeks
*Assistant Examiner*—Cachet I Sellman
(74) *Attorney, Agent, or Firm*—Oblon, Spivak, McClelland, Maier & Neustadt, L.L.P.

(57) ABSTRACT

The invention provides a method of manufacturing or repairing a coating on a metallic substrate. Production of said coating comprises forming a pre-layer on the substrate or on a sub-layer of the coating placed on the substrate by applying one or more layers of a paint containing at least one metal selected from the group constituted by platinum class metals (platinoids) and chromium. Application to the formation or localized repair of a thermal barrier on a superalloy turbo engine part.

23 Claims, No Drawings

METHOD OF MANUFACTURING OR REPAIRING A COATING ON A METALLIC SUBSTRATE

The invention relates to a method of manufacturing or repairing a coating on a metallic substrate.

BACKGROUND OF THE INVENTION

The search for increasing the efficiency of turbomachines, in particular in the field of aviation, and for reducing the fuel consumption and polluting emissions of gas and non-burned residues has resulted in using fuel in near-stoichiometric proportions. That situation is accompanied by an increase in the temperature of the gas leaving the combustion chamber and going towards the turbine.

As a consequence, the materials used in the turbine must be adapted to such an increase in temperature by developing techniques for cooling the turbine blades (hollow blades) and/or by improving the abilities of such materials to withstand high temperatures. That second route, in combination with the use of superalloys based on nickel and/or cobalt, has produced several solutions including depositing a thermally insulating coating termed a thermal barrier.

That type of ceramic coating forming a thermal barrier can create a thermal gradient across the coating on a cooled part running under steady operating conditions, with a total amplitude which may exceed 200° C. for a coating that is about 150 µm (micrometers) thick. The operating temperature of the underlying metal forming the substrate for the coating is reduced by the same amplitude, which induces large increases in the volume of cooling air required, reduces the service life of the part, and increases the specific consumption of the turbine engine.

Of the coatings that are in use, mention can be made of a ceramic based on zirconia stabilized with yttrium oxide.

Clearly, in order to improve the thermal barrier properties, in particular those of binding with the substrate and/or of providing protection against oxidation of the metal of the substrate, a sub-layer can be provided between the substrate and the outer layer of the coating.

In particular, it is known to use a sub-layer made of a MCrAlY type alloy, M being a metal selected from nickel, cobalt, iron, and a mixture of said metals, which alloy consists of a gamma matrix of nickel-cobalt with, in solution, chromium containing β NiAl precipitates.

It is also known to use a sub-layer formed by one or more aluminides, in particular comprising a nickel aluminide optionally containing a metal selected from platinum, chromium, palladium, ruthenium, iridium, osmium, rhodium, or a mixture of said metals, and/or a reactive element selected from zirconium (Zr), hafnium (Hf), and yttrium (Y). As an example, a $Ni_{(1-x)}Pt_xAl$ type coating is used in which the platinum is inserted into a nickel matrix. The platinum is deposited electrolytically prior to the thermochemical aluminizing treatment.

Normally, ceramic coatings are deposited onto the part to be coated either using a projection technique (in particular plasma projection) or a physical vapor deposition technique, i.e. by evaporation (in particular EB-PVD or "Electron Beam Physical Vapor Deposition", forming a coating deposited in a vacuum evaporation chamber under electron bombardment).

With a projected coating, a deposit of oxide based on zirconia is made using plasma projection type techniques, which results in the formation of a coating constituted by a stack of fused droplets which are then shock quenched, flattened, and stacked to form an imperfect densified deposit which is generally in the range 50 micrometers (µm) to 1 millimeter (mm) thick.

A coating which is deposited physically, in particular by evaporation under electron bombardment, produces a coating constituted by an assembly of small columns directed substantially perpendicularly to the surface to be coated, over a thickness in the range 20µm to 600 µm. Advantageously, the space between the columns allows the coating to compensate effectively for thermomechanical stresses due, at operating temperatures, both to the expansion differential with the superalloy substrate and to centrifugal mechanical stresses due to rotation of the blades.

Further, to obtain a coating and/or a sub-layer of the coating, a step consisting in modifying the surface of the superalloy part is sometimes carried out by depositing a layer of platinum that is more than 10 µm thick, and then carrying out a thermal diffusion treatment.

Further still, the Applicant uses a thermochemical coating termed C1A formed by an aluminide coating modified with chromium and resulting from repeatedly carrying out two vapor deposition steps in succession: a first step of depositing a 2 µm to 6 µm thick layer of chromium followed by an aluminizing step.

Said coating is used as a coating to protect parts from oxidation or heat corrosion or, possibly, as a sub-layer for the thermal barrier.

Thus, parts are obtained with long service lives as regards high temperature thermal fatigue.

Conventionally, coatings forming thermal barriers thus create a thermal conductivity discontinuity between the outer layer of the mechanical part, including said thermal barrier, and the substrate of said coating forming the constituent material of the part.

However, such coatings, whether of the thermal barrier type or which protect against heat corrosion or oxidation, are obtained by methods (projection and/or physical vapor deposition and/or electrolytically) which are complex and expensive.

Further, in the event of localized damage to such coatings, whether during manufacture or during operation, the coating is completely reconditioned since a local repair is not possible, thereby engendering other problems. Stripping operations are difficult as they result in a reduction in the thickness of the substrate and an increase in the size of openings, with a corresponding reduction in the service life of the coated parts. After stripping, the coating manufacturing steps are recommenced over the entire surface of the part, and as a result the healthy zones are unnecessarily subjected to risky removal and reconditioning operations. Furthermore, a quantity of precious metal or metals (platinum, chromium, etc) is then lost.

It should also be noted that certain parts exhibit wear in particular zones, in particular at the leading edges and trailing edges of blades in the field of aviation, whether they be fan blades, compressor blades and/or turbine blades of a turbo engine.

In that case, cracks may be produced where the outer layer or even the sub-layer disappears locally, causing oxidation of the part. Such deterioration may require total repair of the part, which consists in removing the old coating, cleaning the part, reconstituting it, and rebuilding a new coating. Although they are very expensive, those operations are nevertheless carried out because the overall cost of the part is very high.

In some cases, said coating (sub-layer and outer layer in the case of a thermal barrier) is mechanically removed as well as reconditioned over a portion only of the part, but over an area which is generally quite large.

OBJECTS AND SUMMARY OF THE INVENTION

The aim of the present invention is to provide a method which can overcome the disadvantages of the prior art and, in particular, can offer the possibility of repairing a coating without having to remove it entirely or to remove a large area thereof.

To this end, the present invention provides a method wherein said coating is produced by forming a pre-layer on the substrate, or on a sub-layer of the coating placed on the substrate, by applying one or more layers of a paint containing at least one metal selected from the group constituted by platinum class metals (platinoids) and chromium.

The term "platinum class metal" or "platinoid" means platinum, palladium, iridium, osmium, rhodium, or ruthenium.

In this manner, it will be understood that merely by applying one or more layers of paint, with an intermediate drying stage, all of the problems linked with complex methods (projection and/or physical vapor deposition and/or electrolytic deposition) used until now to deposit said selected precious metal which forms part of the coating, are overcome.

This solution has the additional advantage, apart from manufacturing the coating, of also allowing it to be repaired locally in a zone which is strictly limited to the zone that is damaged, without modifying either the surface characteristics or the continuity of the properties of the coating.

Overall, by means of the solution of the present invention, it is possible to overcome many of the limitations and disadvantages due to the complex deposition techniques used until now for depositing the selected metal, either directly onto the substrate as the first step, or onto a sub-layer of the coating which is itself placed directly on the substrate, during the method of manufacturing or repairing the coating.

Said deposition of the metal of the pre-layer of the coating using a paint may be carried out by applying said paint using a brush, a spray, a pad, and/or by immersion (dip-coating).

DETAILED DESCRIPTION OF THE INVENTION

Other advantages and characteristics of the invention become apparent from the following description of non limiting examples of applications of the method of the present invention.

Particularly preferred coatings used without a sub-layer include, firstly, the thermochemical aluminide coating termed ClA formed by repeatedly carrying out two vapor deposition steps in succession: a first step of depositing a 2 μm to 6 μm layer of chromium, followed by an aluminizing step.

The order of carrying out these two depositions is strict since it is impossible to deposit chromium onto aluminum by vapor deposition.

After operation, when a local repair is required, it is impossible to redo the deposit in an identical manner limited to said zone, since the aluminum of the part is evaporated during the chromizing stage. As a result, repairing a ClA coating is currently not possible, except by depositing a simple coating of aluminum, with reduced performance in particular as regards heat corrosion.

In the present invention, a pre-layer of platinum is locally applied to the bare substrate, replacing the first deposit of chromium by applying one or more layers of a paint containing platinum. Subsequent aluminizing followed by diffusion heat treatment result in the formation of a coating of platinum aluminide with performance that is far superior to a simple aluminum coating.

More generally, in this first application of the method of the present invention, a repair method is carried out, wherein said coating to be repaired is of the ClA type obtained by prior deposition of chromium onto the substrate followed by a step of vapor aluminizing onto the chromium, and wherein the following steps are carried out in the zone or zones of the coating to be repaired:

a) completely removing the spoilt coating down to the bare substrate;

b) forming said pre-layer on the substrate by applying one or more layers of a paint containing at least one metal selected from the group constituted by platinum class metals (platinoids) and chromium; and c) vapor aluminizing onto the pre-layer, to obtain said aluminide of the selected metal.

It should be understood that only the zone or zones to be repaired have been treated, which is both cheaper and avoids damaging or changing zones which were in good condition prior to the repair step.

Further, in said first application of the method of the present invention, the whole coating may be manufactured ab initio using the solution of the present invention. In this case, in the manufacturing method, said coating comprises an aluminide of the selected metal resulting from the following steps:

a) forming a pre-layer on the substrate by applying one or more layers of a paint containing at least one metal selected from the group constituted by platinum class metals (platinoids) and chromium; and b) vapor aluminizing onto the pre-layer, to obtain said aluminide of the selected metal.

Optionally, and in complementary manner, an additional step c) of diffusion by heat treatment may be carried out.

Secondly, the coatings may act as a thermal barrier with a sub-layer.

Said coating then comprises a binding sub-layer which is produced by forming said pre-layer by applying one or more layers of a paint containing at least one metal selected from the group constituted by platinum class metals (platinoids) and chromium.

Occasionally, for coatings with a binding sub-layer, said binding sub-layer results entirely from forming a pre-layer on the substrate by applying one or more layers of a paint containing at least one metal selected from the group constituted by platinum class metals (platinoids) and chromium, then by diffusion heat treatment.

The above disposition is carried out in particular when the sub-layer consists solely of modifying the surface of a superalloy forming the metallic substrate by depositing a relatively thick layer of platinum 10 μm or more in thickness using the principle of the invention by applying multiple layers of paint, then carrying out diffusion heat treatment.

Coatings with a binding sub-layer include sub-layers based on aluminide. These are known as alumino-former systems, i.e. forming an adherent protective alumina film by oxidation, which isolates the metal from the oxidizing environment. The film of alumina formed by the sub-layers is intended to form a layer similar to a layer of adhesive for the ceramic coating and has a substrate protection function. Adding a precious metal such as platinum to the protective coatings and/or to the coating/thermal barrier sub-layers has the effect of improving the quality of the sub-layer formed and promoting adhesion to the metal.

In this case, in a first variation, said binding sub-layer results from the formation of a pre-layer on the substrate by applying one or more layers of a paint containing at least one metal selected from the group constituted by platinum class metals (platinoids) and chromium, then vapor aluminizing onto the pre-layer and optional diffusion heat treatment.

Here, as in the majority of cases, the metallic substrate is a superalloy so that reaction with the nickel of the substrate produces a binding NiAl type sub-layer with an intermetallic structure, forming compounds defined as 50 atomic % of nickel and aluminum. Because the pre-layer contains at least one metal selected from the group constituted by platinum class metals (platinoids) and chromium, a coating of aluminide is obtained which is modified by a precious metal and is of the $Ni_{(1-x)}Pt_xAl$ type. In particular, if the selected metal is platinum, a structure is obtained in which the platinum is inserted into the nickel lattice.

Coatings with a binding sub-layer based on aluminide include a second variation in which said binding sub-layer is an alloy of the MCrAlY type, M being a metal selected from nickel, cobalt, iron, or a mixture of said metals, said sub-layer being modified by forming said pre-layer on its surface, by applying one or more layers of a paint containing at least one metal selected from the group constituted by platinum class metals (platinoids) and chromium, then by a diffusion heat treatment.

In general, said pre-layer is formed with thickness in the range 1 μm to 30 μm, preferably in the range 2 μm to 10 μm.

By definition, the paint used is a suspension of solid materials in a liquid, the solid materials being formed by particles (metal powder) of metal selected from the group constituted by platinum class metals (platinoids) and chromium.

The liquid may be water-based, leaving no deposit after drying, or oil- or resin-based, or based on any other hydrocarbon (mixture), or an oil-water emulsion; heating to a high temperature in the firing step during manufacture or during the initial operation of the part degrades all the compounds apart from the metal.

Various trials have carried out which have satisfactorily implemented the method of the present invention; these included the following example.

This test was carried out to repair a $Ni_{(1-x)}Pt_xAl$ type coating. Instead of depositing the platinum electrochemically, the deposit was produced by applying the paint described below, before the thermochemical aluminizing step.

A paint from HERAUS was used, containing 8% by weight of platinum in powder form (mean diameter of the order of 2 μm). Said paint is very fluid and is produced in a terpene binder in solution in other solvents.

Paint of that type is routinely used to decorate crockery.

Twenty layers of paint were applied using a brush with an intermediate drying period of 10 to 15 minutes in air, then on a hotplate at 200° C. for 5 minutes and finally in an oven for 15 minutes at 600° C.

A firing step was carried out at 700° C. for 15 minutes in a furnace.

The aluminizing step was carried out at 1050° C. for 5 hours using the following procedure: the sample was placed in an aluminizing chamber containing the aluminum donor cement, and a sufficient quantity of $NH_4F$ was added.

The diffusion step then consisted in placing the sample at 1050° C. for one hour.

After analysis, aluminizing was confirmed by the presence of an outer layer of aluminide 10 μm to 15 μm or even 20 μm thick on an inner layer of intermetallic compounds which was of the order of 10 μm thick.

Thus, it is possible to produce a coating of aluminide modified with platinum from a paint producing the platinum deposit.

What is claimed is:

1. A method of repairing a coating forming a thermal barrier on a superalloy substrate, wherein said coating to be repaired is a ClA coating obtained by prior deposition of chromium onto the superalloy substrate followed by a step of vapor aluminizing onto the chromium, and wherein the following steps are carried out in a zone or zones of the coating to be repaired:
   a) completely removing a spoilt coating down to the superalloy substrate;
   b) forming a pre-layer on the superalloy substrate by applying one or more layers of a paint containing at least one metal selected from the group consisting of platinum class metals (platinoids) and chromium; and
   c) vapor aluminizing onto the pre-layer, to obtain an aluminide of said at least one metal.

2. A method according to claim 1, wherein said metal is platinum.

3. A method according to claim 1, wherein said pre-layer is formed with a thickness within a range of 1 μm to 30 μm.

4. A method according to claim 3, wherein said thickness is within a range of 2 μm to 10 μm.

5. A method according to claim 1, wherein said pre-layer is formed by applying said paint using a brush, a spray gun, a pad, and/or by immersion (dip-coating).

6. A method according to claim 1, wherein said steps are performed only on said zone or zones to be replaced and not on other zones which are in good condition.

7. A method according to claim 1, wherein forming said pre-layer is performed by applying a plurality of layers of said paint.

8. A method according to claim 1, wherein said paint is a suspension of solid material in a liquid, said solid material being a metal powder of said at least one metal.

9. A method according to claim 8, wherein said liquid is water-based.

10. A method according to claim 8, wherein said liquid is oil based.

11. A method according to claim 8, wherein said liquid is based on an hydrocarbon mixture.

12. A method according to claim 1, wherein forming a pre-layer by applying one or more layers of paint occurs immediately before vapor aluminizing onto the pre-layer.

13. A method according to claim 1, wherein the vapor aluminizing includes exposing the pre-layer to $NH_4F$.

14. A method of manufacturing or repairing a coating forming a thermal barrier on a superalloy substrate, wherein said coating comprises a binding sub-layer formed by an MCrAlY alloy, M being a metal selected from the group consisting of nickel, cobalt, iron and a mixture of said metals, said binding sub-layer being modified by forming a pre-layer on a surface of said binding sub-layer by:
   first applying one or more layers of a paint including chromium to the binding sub-layer, and
   second, performing diffusion heat treatment of the one or more layers of paint.

15. A method according to claim 14, wherein said pre-layer is formed with a thickness within a range of 1 μm to 30 μm.

16. A method according to claim 14, wherein said pre-layer is formed by applying said paint using a brush, a spray gun, a pad, and/or by immersion (dip-coating).

17. A method according to claim 15, wherein said thickness is within a range of 2 μm to 10 μm.

18. A method according to claim 14, wherein said sub-layer comprises NiAl.

19. A method according to claim 14, wherein said sub-layer is based on an aluminide.

20. A method according to claim 14, wherein said paint is a suspension of solid material in a liquid, said solid material being a metal powder of said at least one metal.

21. A method according to claim 20, wherein said liquid is water-based.

22. A method according to claim 20, wherein said liquid is oil based.

23. A method according to claim 20, wherein said liquid is based on an hydrocarbon mixture.

* * * * *